US005387458A

United States Patent [19]

Pavelka et al.

[11] Patent Number: 5,387,458

[45] Date of Patent: Feb. 7, 1995

[54] ARTICLES EXHIBITING DURABLE FLUORESCENCE WITH AN ULTRAVIOLET SCREENING LAYER

[75] Inventors: Lee A. Pavelka, Cottage Grove; David M. Burns, Woodbury; Raymond P. Johnston, Lake Elmo; Edward S. Shinbach, St. Paul, all of Minn.

[73] Assignee: Minnesota Mining and Manufacturing Company, St. Paul, Minn.

[21] Appl. No.: 240,074

[22] Filed: May 9, 1994

Related U.S. Application Data

[63] Continuation of Ser. No. 975,113, Nov. 12, 1992, abandoned, which is a continuation of Ser. No. 624,195, Dec. 6, 1990, abandoned.

[51] Int. Cl.[6] .......................... B32B 27/20; G02B 5/12

[52] U.S. Cl. .................................... 428/141; 428/325; 428/156; 428/142; 428/906; 428/913; 428/412; 428/480; 428/473.5; 428/500; 428/354; 428/212; 428/215; 359/361; 359/529; 359/536

[58] Field of Search ............... 428/144, 325, 156, 142, 428/906, 913, 412, 480, 473.5, 500, 354, 212, 215; 359/361, 529, 536

[56] References Cited

U.S. PATENT DOCUMENTS

| | | | |
|---|---|---|---|
| Re. 24,906 | 12/1960 | Ulrich | 206/59 |
| 2,809,954 | 10/1957 | Kazenas | 525/515 |
| 3,190,178 | 6/1965 | McKenzie | 88/82 |
| 3,830,682 | 8/1974 | Rowland | 161/2 |
| 4,424,449 | 1/1984 | O'Brill | 250/461.1 |
| 4,443,226 | 4/1984 | Röhser | 8/532 |
| 4,808,471 | 2/1989 | Grunzinger | 428/325 |
| 4,844,976 | 7/1989 | Huang | 428/913 |
| 4,861,651 | 8/1989 | Goldenhersh | 428/913 |
| 4,876,237 | 10/1989 | Bzersekal | 428/913 |
| 4,886,774 | 12/1989 | Doi | 428/913 |
| 5,045,396 | 9/1991 | Lin et al. | 428/412 |

FOREIGN PATENT DOCUMENTS

| | | |
|---|---|---|
| 2-16042 | 1/1990 | Japan . |
| WO89/02637 | 9/1988 | WIPO . |

*Primary Examiner*—William P. Watkins, III
*Attorney, Agent, or Firm*—Gary L. Griswold; Walter N. Kirn; Robert H. Jordan

[57] ABSTRACT

Article comprising an ultraviolet screening screen layer and a color layer containing a defined daylight fluorescent dye dissolved in a defined polymeric matrix. The article exhibits durable fluorescence and resistance to degradation from exposure to sunlight. If desired, the article is retroreflective.

19 Claims, 1 Drawing Sheet

ARTICLES EXHIBITING DURABLE FLUORESCENCE WITH AN ULTRAVIOLET SCREENING LAYER

This is a continuation of application Ser. No. 07/975,113 filed Nov. 12, 1992, now abandoned, which is a continuation of application Ser. No. 07/624,195 filed Dec. 6, 1990, now abandoned.

FIELD OF INVENTION

The present invention relates to articles which exhibit durable fluorescence, and in one embodiment relates particularly to retroreflective sheetings which exhibit durable fluorescence.

BACKGROUND

Retroreflective signs have achieved widespread use for safety and informational signs along roads because of the high nighttime visibility they provide. In order to enhance the daytime visibility of such signs, it has been suggested to make the signs fluorescent as well as retroreflective. U.S. Pat. No. 3,830,682 (Rowland) discloses cube-corner type retroreflective sheetings which incorporate fluorescent dyes, e.g., rhodamine and fluorescein dyes. The resultant signs provide fluorescent ambient appearance and bright, colored retroreflection.

A problem with fluorescent retroreflective sheetings is that upon, in some cases relatively moderate, exposure to solar radiation, such as is encountered in sunlit outdoor applications, the fluorescent properties of the sheetings degrade. Many fluorescent dyes tend to fade or become colorless. This loss in fluorescent performance causes the ambient color of the subject sheeting to fade as well as changing the retroreflective appearance of the sign, thereby impairing the effectiveness of the sign and reducing the potential safety benefits thereof. In some instances, such degradation can occur over as short a time as six months.

U.S. Pat. No. 3,830,682 (Rowland) discloses retroreflective articles comprising synthetic plastic resins and fluorescent dyes such as rhodamine and fluoroscein dyes.

Japan Kokai No. 2-16042, Application No. 63-165914 (Koshiji et al.) discloses fluorescent articles comprising a screen layer and a layer containing a fluorescent coloring agent wherein the screen layer permits a defined range of transmission of light. According to the reference, the screen layer must have a transmittance of more than 30 percent at 370 nanometers and less than 20 percent at 340 nanometers. The reference further teaches that the coloring agent may be any fluorescent coloring agent and that the binder or matrix of the colored layer is subject to no critical limitation.

SUMMARY OF INVENTION

The present invention provides articles that exhibit a surprising enhancement in fluorescent durability, i.e., the fluorescent properties of the articles are retained longer than is expected, even upon prolonged exposure to direct sunlight. Sunlight, i.e., ground level solar radiation, comprises electromagnetic radiation having wavelengths within the range of about 290 nanometers up through visible light range.

In brief summary, fluorescent articles of the invention comprise a color layer having first and second sides and a screen layer disposed to the first side of said color layer, wherein:

a) the color layer comprises a defined fluorescent dye dissolved in a defined polymeric matrix; and b) the screen layer being substantially transparent to visible light and comprising means for screening substantial portions of ultraviolet radiation which is incident thereto.

The color layer and screen layer may be separate layers arranged in the defined manner or may be laminated together, either directly or with an intermediate adhesive layer.

In one particularly useful class of embodiments, the article is retroreflective and the color layer is substantially transparent, with the color layer either having retroreflective elements formed on its second, i.e., back side, or having a retroreflective base layer comprising retroreflective elements disposed on its second side.

BRIEF DESCRIPTION OF DRAWING

The invention will be further explained with reference to the drawing, wherein.

These figures, which are idealized, are not to scale and are intended to be merely illustrative and non-limiting.

DETAILED DESCRIPTION OF ILLUSTRATIVE EMBODIMENTS

Figure 1:
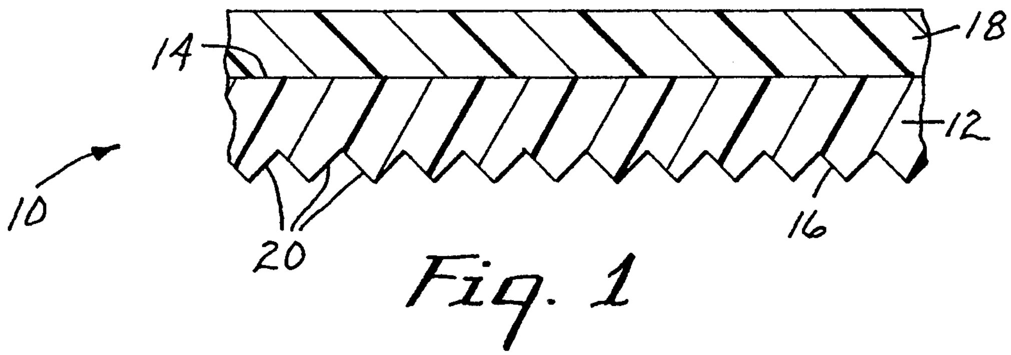
FIG. 1 is a cross-sectional illustration of a portion of one retroreflective embodiment of the invention.

FIG. 1 shows typical fluorescent article 10 of the invention comprising color layer 12 with first, i.e., front, side 14 and second, i.e., back, side 16 and overlay or screen layer 18 disposed on first side 14. In the embodiment illustrated, screen layer 18 is laminated directly to color layer 12. Article 10 is retroreflective, and color layer 16 has retroreflective elements 20, e.g., cube-corner retroreflective elements, formed therein.

Figure 2:
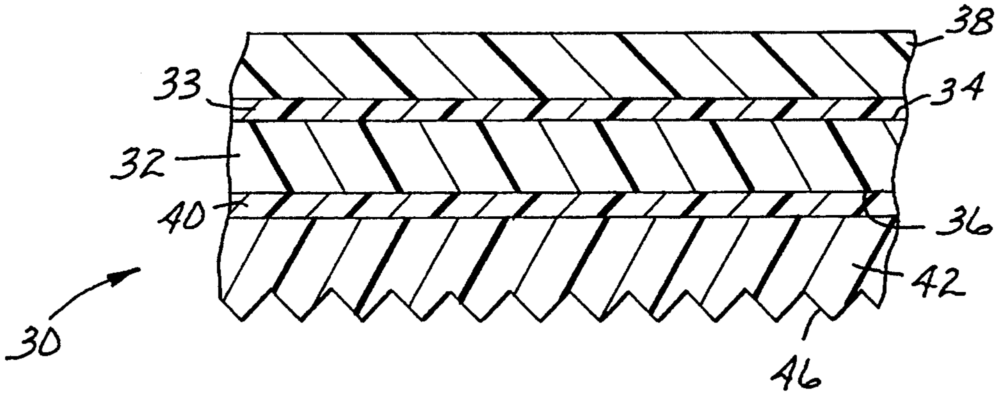
FIG. 2 is a cross-sectional illustration of a portion of another retroreflective embodiment of the invention.

FIG. 2 shows another typical fluorescent article 30 comprising color layer 32 with first side 34 and second side 36 and screen layer 38 disposed on first side 34. In the embodiment illustrated, screen layer 38 is bonded to color layer 32 with intermediate adhesive layer 33. In order to render article 30 retroreflective, retroreflective base sheet 42 has been bonded to second side 36 with intermediate adhesive layer 40.

Color layers of articles of the invention comprise a defined daylight fluorescent dye dissolved in a defined polymeric matrix.

The polymeric matrix is typically preferably substantially transparent to visible light, particularly to light of the wavelengths emitted by the dye and light of the wavelengths which cause the dye to fluoresce. The polymeric matrix is selected from one or more of the following: polycarbonate, polyacrylic imide, polyester, or polystyrene. In embodiments wherein the color layer has reflective elements formed therein, e.g., cube-corner reflectors, polycarbonate is typically preferred because it tends to exhibit greater dimensional stability than polyester. Preferably, the matrix consists essentially of one of the indicated polymers. Color layers made with a single polymer matrix material will typically tend to exhibit greater transparency than will those made with substantial portions, e.g., 5 weight percent or more each, of two or more polymers. However, blends of two or more substantially transparent polymers that are substantially miscible are typically transparent and may be used herein.

The fluorescent dye, which is a daylight fluorescent dye, i.e., one which emits visible light upon exposure to light of a visible wavelength is selected from the following: thioxanthene dye, thioindigoid dye, benzoxazole coumarin dye, or perylene imide dye. If desired, a combination of such dyes may be used.

Typically, the color layer contains between about 0.01 and about 1.0, preferably between about 0.05 and about 0.3, weight percent of dye. Color layers that contain lower amounts of dye may not exhibit the degree of bright fluorescence which is desired. As will be understood by those skilled in the art, however, thicker color layers containing a specified loading of dye will typically exhibit brighter fluorescence and deeper color than do thinner color layers containing the same dye loading. Color layers which contain high levels of fluorescent dye may exhibit self-quenching phenomena. It has been observed that between two embodiments of the invention wherein the color layers have substantially equivalent initial fluorescent brightness and appearance, the first color layer being made with relatively greater thickness and a relatively lower dye loading and the second color layer being made with relatively thinner thickness and relatively higher dye loading, the color layer having the lower dye loading exhibited greater fluorescent durability than the other color layer. Both embodiments, however, exhibited greater fluorescent durability than expected.

In some instances, the dye in the color layer will consist essentially of thioxanthene, thioindigoid, benzoxazole coumarin, and/or perylene imide dyes. In other instances, however, the color layer may also contain coloring agents such as pigments or other dyes in addition to those described above to adjust the color and appearance of the article. For instance, polycarbonate typically has a slight yellowish cast or appearance and minor amounts, e.g., about 0.01 weight percent or less, of colorants sometimes referred to as "bluing agents" may be incorporated therein to yield a substantially colorless or "water white" appearance. Typically, the color layer will contain at most limited quantities of dyes other than those described above as other dyes typically do not exhibit desired durable fluorescence and color layers which contain high proportions thereof will be subject to detrimental effects upon prolonged exposure to sunlight. If desired, non-fluorescent dyes or pigments may also be used, however, such dyes should be selected so as to not undesirably interfere with the fluorescent performance of the daylight fluorescent dyes discussed above or with the overall appearance of the article. In the case of retroreflective articles, any non-fluorescent dyes or pigments used should not undesirably impair the transparency of the color layer.

In some embodiments, e.g., wherein the article is a retroreflective sheeting, the color layer is typically between about 2 and about 25 mils (50 and 625 micrometers) thick as such thicknesses offer a useful balance of cost and performance, particularly for retroreflective embodiments. If desired, however, color layers having thicknesses outside this range may be made in accordance with the invention.

Figure 3:
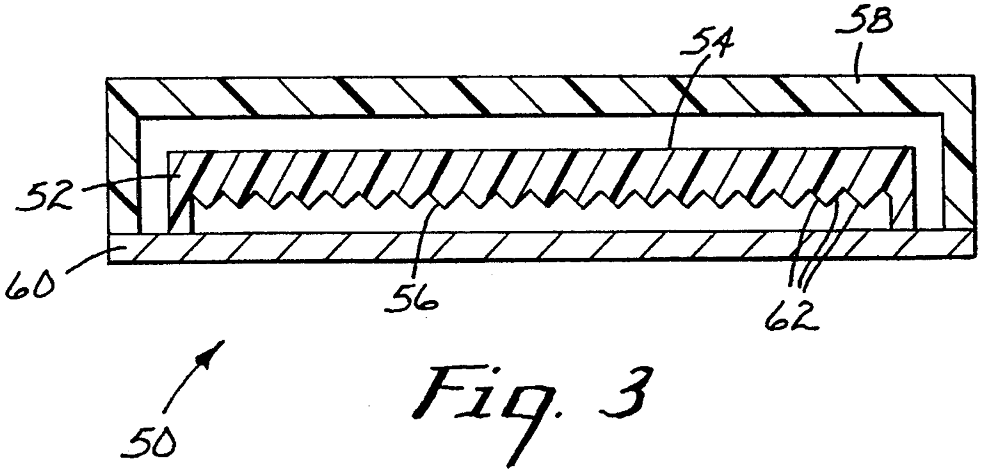
FIG. 3 is a cross-sectional illustration of another retroreflective embodiment of the invention.

The screen layer is disposed to the first or front side of the color layer so as to shield same from ultraviolet radiation which is incident to the article. This is the side of the article which is displayed and is desirably fluorescent. In the case of retroreflective embodiments, this side exhibits retroreflective properties, i.e., light such as from vehicle headlights that is incident thereto is retroreflected. As shown in FIG. 1, screen layer 18 may be in direct contact with color layer 12, or, as shown in FIG. 2, screen layer 38 may be bonded to color layer 32 with intermediate layer 33, or, as shown in FIG. 3, screen layer 58 may be arranged in front of color layer 52 substantially without contacting it. Preferably, the screen layer and color layer are substantially coextensive such that the screen layer protects substantially all of the color layer.

The screen layer and, if used, the adhesive intermediate to the screen layer and color layer, are preferably substantially transparent to visible light of the wavelength emitted by the fluorescent dye in the color layer as well as being substantially transparent to light of the wavelength which excites the dye. At ground level solar radiation comprises electromagnetic radiation having wavelengths greater than about 290 nanometers, with the range of about 400 to about 700 nanometers typically being considered the visible light range. Radiation having lower wavelengths is believed to be the most damaging to fluorescent durability of dyes in the color layer, thus the screen layer preferably blocks a substantial portion, i.e., at least about 10 percent, more preferably at least about 50 percent, and most preferably substantially all, of the incident radiation having a wavelength below about 340 nanometers, more preferably below about 370 nanometers, and most preferably below about 400 nanometers. Radiation of these ranges is a major cause of the loss of fluorescent brightness of fluorescent dyes in polymeric matrices. In some embodiments, the screen layer may even screen electromagnetic radiation having wavelengths above about 400 up to, but below, the wavelengths which excite the dye. Although such screen layers would provide more effective protection to the color layer, they would tend to have a colored appearance which must be taken into account when formulating the color of the color layer such that the resultant article is of desired color. If desired, tinting screen layers, color layers, and/or intermediate adhesive layers (if any) to screen selected visible wavelengths could be used to tune the fluorescent response of the article.

The screen layer comprises means for screening ultraviolet radiation; it may be made of a material that inherently screens radiation as desired, or it may comprise a matrix which contains a selected screening agent to impart desired characteristics thereto. If an intermediate adhesive is used, it may contain ultraviolet screening agent so as to function as a screen layer.

It has been observed that incorporating ultraviolet radiation screening agents in the color layer may tend to provide minor improvements in fluorescent durability of the fluorescent dye contained therein, but the effect is relatively minor in relation to the advantages provided by use of separate screen and color layers as provided herein.

Although we do not wish to be bound by this theory, it is believed that, by screening radiation as discussed above, the screen layer prevents an as yet undefined degradation and/or reaction between the dyes and polymeric matrix materials which would otherwise occur. Insofar as we know, the advantages of the present invention are attained through the use of the combinations of fluorescent dyes and polymeric matrix materials discussed herein.

As discussed above, in some embodiments, articles of the invention are retroreflective. Such capability may be achieved as shown in FIG. 1 by forming retroreflective elements 20 on second side 16 of color layer 12, or alternatively as shown in FIG. 2 by attaching retroreflective base sheet 42 to second 36 of color layer 32, either with transparent intermediate adhesive layer 40 as shown or by laminating the base sheet and color layer in direct contact with one another (not shown). As shown in FIG. 2, retroreflective base sheet 42 comprises a member with cube-corner retroreflective elements formed on back side 46 thereof. In other embodiments, the retroreflective base sheet may comprise a microsphere-based retroreflective structure, e.g., comprising a monolayer of transparent microspheres and reflective means disposed on the opposite side of the monolayer as the color layer. For instance, a screen layer/color layer combination of the invention may be laminated to the front surface of the cover film of an encapsulated-lens retroreflective sheeting such as is disclosed in U.S. Pat. No. 3,190,178 (McKenzie) or it may even be used as the cover film of an encapsulated-lens sheeting. In retroreflective embodiments, the color layer or at least that portion of it which is disposed in front of the retroreflective elements, i.e., between the retroreflective elements and the screen layer, should be substantially transparent to visible light.

FIG. 3 illustrates another retroreflective embodiment of the invention wherein the article of the invention is a "button-type" retroreflector. Article 50 comprises color layer 52 with first side 54 and second side 56, screen layer 58 disposed to first side 54, and base member 60, with screen layer 58 and base member 60 enclosing color layer 52. Second side 56 has retroreflective elements 62 formed therein. Screen layer 58 and color layer 52 can be disposed spaced apart from one another as shown, or alternatively may be placed in contact with one another. Article 50 can be mounted on a backing (not shown), e.g., a sign panel, such that first side 54 is presented for viewing and retroreflective effect, with screen layer 58 protecting the fluorescent durability of color layer 52 as described herein.

If desired, articles of the invention may be made in substantially rigid or flexible form. For example, in some embodiments the article may be sufficiently flexible to be wound about a mandrel having a diameter of about 1 centimeter.

EXAMPLES

The invention will be further explained by the following illustrative examples which are intended to be nonlimiting. Unless otherwise indicated, all amounts are expressed in parts by weight.

The following abbreviations are used in the examples:

| Abbreviation | Meaning |
|---|---|
| AU | Acrylic urethane; |
| PAI | Polyacrylic imide; |
| PC | Polycarbonate; |
| PO | Polyolefin copolymer; |
| PEC | Polyester carbonate; |
| PET | Polyethylene terephthalate; |
| PMMA | Polymethylmethacrylate; |
| PS | Polystyrene; |
| PVC | Polyvinyl chloride (plasticized); |
| SCA | Solution cast acrylic; |
| RED GG | HOSTASOL RED GG - Solvent Orange 63 thioxanthene dye from Hoechst Celanese; |
| RED 5B | HOSTASOL RED 5B - Vat Red 41 thioindigoid dye from Hoechst Celanese; |
| LUMOGEN | LUMOGEN F240 Orange - perylene imide dye from BASF; |
| MACROLEX | MACROLEX 10GN - Solvent Yellow 160:1 benzoxazole coumarin dye from Mobay Corp.; |
| 3G | HOSTASOL YELLOW 3G - Solvent Yellow 98 thioxanthene dye from Hoechst Celanese; and |
| GREEN GOLD | FLUOROL GREEN GOLD 084 - Solvent Green 5 perylene dye from BASF. |

To simulate outdoor exposure to sunlight on an accelerated basis, in Examples 1–4 samples were exposed in accordance to ASTM G 26 - Type B, Method A, with a water-cooled xenon arc device with borosilicate inner and outer filters for periods of 102 minutes of exposure at a Black Panel temperature of about 63° C. following by 18 minutes of exposure while subjecting the sample to deionized water spray. One thousand hours exposure on this device is believed to be equivalent to several months exposure to direct sunlight in an outdoor setting.

Unless otherwise indicated, the following test methods were used.

COLOR

Color was determined by one of two techniques as indicated.

In the first technique, referred to herein as "ISC", a Spectrosensor Integrating Sphere Colorimeter from Applied Color Systems was used at the following settings and conditions:

D65 Illuminate,
d/0 Geometry,
Large Area View - Specular Included,
2 Degree Observer,
200 Percent Reflectance Setting, with measurements being taken every 10 nanometers over a range of 400 to 700 nanometers.

In the second technique, referred to herein as "CSC", a Compuscan Colorimeter from Applied Color Systems was used at the following settings and conditions:

D65 Illuminate,
0/45 Geometry,
30 millimeter port size,
2 Degree Observer, with measurements being taken every 20 nanometers over a range of 400 to 700 nanometers.

ISC and CSC are believed to provide equivalent color definition results.

Peak Retention, was calculated as the ratio in percent of percentage reflectance of the sample after exposure for the indicated time to the percentage reflectance of the sample before exposure at the wavelength of the initial peak percentage reflectance.

The CIELAB color difference, Delta E, between the sample after exposure for the indicated period of time and the unexposed sample was determined. Delta E is a function of several color vector components. Accordingly, it should be understood that the Delta E results provided herein should be compared only within pairs of Samples wherein the color layers are equivalent as presented in the tables, but not between Samples of separate pairs. For instance, the Delta E obtained by Sample 5-1 can be meaningfully compared with Sample 5-A, but does not provide any meaningful significance with respect to the Delta E obtained with Sample 5-B or 5-2.

Retained Fluorescence

Fluorescence was determined using a SPEX Brand Fluorolog Spectrophotometer consisting of a xenon lamp powered by a ELXE 500 watt power supply, Model 1680 0.22 meter double spectrometer detector, Model 1681 0.22 meter spectrometer source, and a Products-for-Research Photomultiplier Model R298/115/381 operated by SPEX DM 300 software at a resolution of 2 nanometers.

Retained Fluorescence was calculated as the ratio in percent of fluorescent intensity of the sample after exposure for the indicated time to the fluorescent intensity of the unexposed sample, at the wavelength of peak emission of the unexposed sample.

Example 1

Example 1 illustrates the relationship between composition of polymer matrix of the color layer and utility of screen layer in accordance with the invention. In each of the samples, the color layer contained 0.2 weight percent of HOSTASOL Red GG, a thioxanthene dye.

In Sample 1-1 and Comparative Sample 1-A, the color layers consisted essentially of 12 mil (300 micrometer) thick extruded films of water white ultraviolet-stabilized polycarbonate, LEXAN 123R-112 from General Electric Company, believed to contain a small amount of blueing agent and mold release agent. In Sample 1-1, the screen layer was a 3 mil (75 micrometer) thick film consisting essentially of polymethyl methacrylate, LUCITE 47K from Du Pont, and 1.2 weight percent TINUVIN 327, a benzotriazole ultraviolet absorber from Ciba-Geigy. In Comparative Sample 1-A, a similar film without the ultraviolet absorber was used as the screen layer.

In Sample 1-2 and Comparative Sample 1-B, the color layers consisted essentially of 6 mil (150 micrometer) thick extruded films of KAMAX T-260, a polyacrylic imide from Rohm and Haas, to which 0.2 weight percent CYASORB UV 5411, a benzotriazole ultraviolet absorber from American Cyanamid, was added. In Sample 1-2, the screen layer was a 2 mil (50 micrometer) thick solvent cast film consisting essentially of an aliphatic acrylic polyurethane and 3 weight percent solids UVINUL 400, a benzophenone ultraviolet absorber from BASF, with a 1 mil (25 micrometer) thick layer of pressure-sensitive adhesive, isooctylacrylate/acrylic acid crosslinked with aziridine, on one side thereof. U.S. Pat. No. 4,808,471 (Grunzinger) discloses such films and U.S. Pat. No. Re. 24,906 (Ulrich) discloses such adhesives. In Comparative Sample 1-B, a similar film without the ultraviolet absorber was used as the screen layer.

In Sample 1-3 and Comparative Sample 1-C, the color layers consisted essentially of 6 mil (150 micrometer) thick extruded films of polyethylene terephthalate (intrinsic viscosity of 0.59 and molecular weight of about 20,000 to 25,000). In Sample 1-3 and Comparative Sample 1-C, the screen layers were like those used in Sample 1-2 and Comparative Sample 1-B, respectively.

In Sample 1-4 and Comparative Sample 1-D, the color layers consisted essentially of 6 mil (150 micrometer) thick extruded films of impact modified polystyrene, STYRON 615APR from Dow Chemical Company, to which 0.2 weight percent CYASORB UV 5411 was added. In Sample 1-4 and Comparative Sample 1-D, the screen layers were like those used in Sample 1-2 and Comparative Sample 1-B, respectively. The respective screen layers were bonded to the first sides of the color layers with an intermediate adhesive as in Sample 1-2 and Comparative Sample 1-B.

In Comparative Samples 1-E and 1-F, the color layers consisted essentially of 12 mil (300 micrometer) thick extruded films of LUCITE 47K, polymethyl methacrylate from Du Pont containing 0.2 weight percent CYASORB UV 5411. In Comparative Sample 1-E, the screen layer was like that used in Comparative Sample 1-B. In Comparative Sample 1-F, no screen layer was used.

In Comparative Samples 1-G and 1-H, the color layers consisted essentially of 6 mil (150 micrometer) thick extruded films of APEC DP9-9308NT, polyester carbonate from Mobay Corp. containing 0.2 weight percent of CYASORB UV 5411. In Sample 1-G, the screen layer was like that used in Sample 1-2. In Comparative Sample 1-H, a similar film without the ultraviolet absorber was used as the screen layer.

In Comparative Samples 1-I and 1-J, the color layers consisted essentially of 2 mil (50 micrometer) thick solution cast films of acrylic urethane. In Sample 1-I, the screen layer was like that used in Sample 1-2. In Comparative Sample 1-J, a similar film without the ultraviolet absorber was used as the screen layer.

In Comparative Samples 1-K and 1-L, the color layers consisted essentially of 3 mil (75 micrometer) thick solution cast films of plasticized polyvinyl chloride. In Sample 1-K, the screen layer was like that used in Sample 1-2. In Comparative Sample 1-L, a similar film without the ultraviolet absorber was used as the screen layer.

In Sample 1-1 and Comparative Samples 1-A, 1-E, and 1-F, the respective screen layer and color layer combinations were placed, with the screen layer in contact with the first side of the color layer, in a stamper shaped to form cube-corner retroreflective elements and stamped at about 204° C. to form cube-corner retroreflective elements on the second surface of the color layer.

In Samples 1-2, 1-3, and 1-4 and Comparative Samples 1-B, 1-C, 1-D, 1-G, 1-H, 1-I, 1-J, 1-K, and 1-L, the screen layers were bonded to the first sides of the color layers with intermediate adhesive as described above. A retroreflective base sheet, SCOTCHLITE Brand Retroreflective Sheeting Diamond Grade No. 3970 from 3M, was then bonded to the second sides of the color layers with the same adhesive.

The results are tabulated in Table I.

TABLE I

| Sample | Matrix[1] | Screen[2] | Time[3] | Peak Reten[4] | Delta E[5] | Retain Fluor[6] |
|---|---|---|---|---|---|---|
| 1-1 | PC | Yes | 1000 | 71 | 18 | 85 |
| 1-A | PC | No | 1000 | 55 | 30 | 67 |
| 1-2 | PAI | Yes | 1000 | 84 | 14 | 90 |
| 1-B | PAI | No | 1000 | 73 | 31 | 72 |
| 1-3 | PET | Yes | 1000 | 93 | 6 | 103 |
| 1-C | PET | No | 1000 | 84 | 9 | 79 |
| 1-4 | PS | Yes | 500 | 77 | 21 | NM[7] |
| 1-D | PS | No | 500 | 68 | 29 | NM[7] |
| 1-E | PMMA | Yes | 1000 | 57 | 27 | 52 |
| 1-F | PMMA | None | 1000 | 57 | 27 | 60 |
| 1-G | PEC | Yes | 1000 | 69 | 20 | 76 |
| 1-H | PEC | No | 1000 | 69 | 20 | 70 |
| 1-I | AU | Yes | 500 | 48 | 84 | NM[8] |

TABLE I-continued

| Sample | Matrix[1] | Screen[2] | Time[3] | Peak Reten[4] | Delta E[5] | Retain Fluor[6] |
|---|---|---|---|---|---|---|
| 1-J | AU | No | 500 | 47 | 88 | NM[8] |
| 1-K | PVC | Yes | 500 | 41 | 100 | NM[8] |
| 1-L | PVC | No | 500 | 40 | 100 | NM[8] |

[1]Matrix polymer
[2]Whether screen layer contained UV screening agent, in 1-F no screen layer was used
[3]Exposure time in hours
[4]Peak Retention
[5]CIELAB color difference determined by CSC
[6]Retained Fluorescence
[7]Not Measured, but Sample 1-4 was determined by visual inspection to have higher Retained Fluorescence than Sample 1-D
[8]Not Measured, visually observed to have essentially no retained color These results illustrate that the effectiveness of the invention is dependent upon the polymeric matrix material of the color layer.

EXAMPLE 1

Example 2 illustrates changing the polymeric matrix of the screen layer.

In Samples 2-1, 2-2, and 2-3 and Comparative Samples 2-A, 2-B, and 2-C, the color layers consisted essentially of 12 mil (300 micrometer) thick extruded films of polycarbonate, LEXAN 123R-112 containing 0.12 weight percent of HOSTASOL RED GG. In Sample 2-4 and Comparative Sample 2-D, the color layers were similar except they contained 0.2 weight percent of the fluorescent dye.

In Sample 2-1 and Comparative Sample 2-A, retroreflective elements were embossed in the second sides of the color layers and then screen layers were bonded to the first sides of the color layers with an intermediate layer of adhesive as used in some samples of Example 1. The screen layers were 2 mil (50 micrometer) thick films of acrylic polyurethane. In Sample 2-1 the screen layer contained 3 weight percent UVINUL 400.

In Sample 2-2 and Comparative Sample 2-B, retroreflective elements were embossed in the second sides of the color layers and then the screen layers were hot laminated directly to the first sides of the color layers. The screen layers were 2 mil (50 micrometer) thick films of ethylene/acrylic acid copolymer. In Sample 2-2 the screen layer contained an ultraviolet absorber.

In Sample 2-3 and Comparative Sample 2-C, retroreflective elements were embossed in the second sides of the color layers and then screen layers were solvent cast on the first sides of the color layers and dried. The screen layers were 0.8 to 1.0 mil (20 to 25 micrometer) thick films of solution cast acrylic, ACRYLOID B66 from Rohm and Haas. In Sample 2-3 the screen layer contained 1.2 weight percent TINUVIN 327.

In Sample 2-4 and Comparative Sample 2-D, retroreflective elements were embossed in the second sides of the color layers and polymethyl metharylate screen layers were laminated to the first sides of the color layers as in Samples 1-1 and 1-A, respectively. The screen layers were 3 mil (75 micrometer) thick films of LUCITE 47K. In Sample 2-4 the screen layer contained 1.2 weight percent TINUVIN 327.

The percentage transmittance of the screen layers at the indicated wavelengths (in nanometers) was as follows:

TABLE IIa

| | Wavelength | | | |
|---|---|---|---|---|
| Screen | 400 | 370 | 340 | 300 |
| 2-1 | 84 | 43 | 0 | 0 |
| 2-A | 78 | 75 | 69 | 59 |
| 2-2 | 80 | 2 | 0 | 0 |
| 2-B | 84 | 77 | 70 | 67 |
| 2-3 | 87 | 10 | 1 | 1 |
| 2-4 | 89 | 88 | 88 | 86 |
| 2-4 | 56 | 0 | 0 | 0 |
| 2-D | 87 | 81 | 71 | 67 |

The fluorescent durability results obtained with the resultant fluorescent articles are tabulated in Table IIb.

TABLE IIb

| Sample | Matrix[1] | Screen[2] | Time[3] | Peak Reten[4] | Delta E[5] | Retain Fluor[6] |
|---|---|---|---|---|---|---|
| 2-1 | AU | Yes | 1000 | 85 | 7 | 91 |
| 2-A | AU | No | 1000 | 76 | 12 | 85 |
| 2-2 | PO | Yes | 1000 | 89 | 7 | 103 |
| 2-B | PO | No | 1000 | 79 | 13 | 86 |
| 2-3 | SCA | Yes | 1000 | 82 | 8 | NM[7] |
| 2-C | SCA | No | 1000 | 75 | 13 | NM[7] |
| 2-4 | PMMA | Yes | 1000 | 77 | 15 | 85 |
| 2-D | PMMA | No | 1000 | 64 | 23 | 67 |

[1]Matrix polymer of screen layer
[2]Whether screen layer contained UV screening agent
[3]Exposure time in hours
[4]Peak Retention
[5]CIELAB color difference determined by CSC
[6]Retained Fluorescence
[7]Not Measured, but Sample 2-3 was determined to have higher Retained Fluorescence by visual inspection These results illustrate that the effectiveness of the screen layer is dependent upon its screening properties and not its composition.

EXAMPLE 3

Example 3 illustrates color layers containing different amounts of Red GG fluorescent dye in two different polymeric matrix materials.

In each sample, the color layer consisted essentially of a 12 mil (300 micrometer) thick extruded film of the indicated matrix polymer containing the indicated amount of dye. The samples were all exposed for 1000 hours.

The results are tabulated in Table III.

TABLE III

| Sample | Matrix[1] | Dye[2] | Screen[3] | Peak Reten[4] | Delta E[5] |
|---|---|---|---|---|---|
| 3-1 | PC | 0.01 | Yes | 91 | 8 |
| 3-A | PC | 0.01 | No | 82 | 15 |
| 3-2 | PC | 0.1 | Yes | 88 | 8 |
| 3-B | PC | 0.1 | No | 72 | 17 |
| 3-3 | PC | 0.3 | Yes | 63 | 23 |
| 3-C | PC | 0.3 | No | 41 | 43 |
| 3-D | PMMA | 0.01 | Yes | 63 | 44 |
| 3-E | PMMA | 0.01 | No | 71 | 31 |
| 3-F | PMMA | 0.1 | Yes | 74 | 31 |
| 3-G | PMMA | 0.1 | No | 76 | 30 |
| 3-H | PMMA | 0.3 | Yes | 52 | 27 |
| 3-I | PMMA | 0.3 | No | 51 | 27 |

[1]Matrix polymer
[2]Weight percent of fluorescent dye in color layer
[3]Whether screen layer contained UV screening agent
[4]Peak Retention
[5]CIELAB color difference determined by ISC.

These results illustrate that the invention is effective over a range of dye concentrations with polycarbonate color layers, but not with polymethyl methacrylate color layers.

EXAMPLE 4

Example 4 illustrates different dyes and color layer polymeric matrix materials.

The results are tabulated in Table IV.

TABLE IV

| Sample | Matrix[1] | Dye[2] | Screen[3] | Time[4] | Peak Reten[5] | Delta E[6] |
|---|---|---|---|---|---|---|
| 4-1 | PC | RED 5B | Yes | 500 | 94 | 7(ISC) |
| 4-A | PC | RED 5B | No | 500 | 81 | 11(ISC) |
| 4-B | PMMA | RED 5B | Yes | 500 | 57 | 71(CSC) |
| 4-C | PMMA | RED 5B | .No | 500 | 54 | 69(CSC) |
| 4-2 | PC | MACROLEX | Yes | 1000 | 87 | 9(ISC) |
| 4-D | PC | MACROLEX | No | 1000 | 83 | 12(ISC) |
| 4-E | PMMA | MACROLEX | Yes | 500 | 58 | 57(CSC) |
| 4-F | PMMA | MACROLEX | No | 500 | 61 | 43(CSC) |
| 4-3 | PC | LUMOGEN | Yes | 2000 | 82 | 9(ISC) |
| 4-G | PC | LUMOGEN | No | 2000 | 65 | 21(ISC) |
| 4-H | PMMA | LUMOGEN | Yes | 2000 | 85 | 15(CSC) |
| 4-I | PMMA | LUMOGEN | No | 2000 | 82 | 15(CSC) |
| 4-J | PC | GREEN GOLD | Yes | 500 | 65 | 23(ISC) |
| 4-K | PC | GREEN GOLD | No | 500 | 73 | 17(ISC) |

[1]Matrix polymer
[2]Fluorescent dye
[3]Whether screen layer contained UV screening agent
[4]Exposure in hours
[5]Peak Retention
[6]CIELAB color difference determined by technique indicated in parentheses.

In Samples 4-1, 4-A, 4-2, 4-D, 4-3, and 4-G, when used in a color layer comprising polycarbonate the dyes exhibited substantially improved fluorescent durability with use of a screen layer as provided herein. However, in corresponding Samples 4-B, 4-C, 4-E, 4-F, 4-H, and 4-I the same dyes when used in a color layer comprising polymethyl methacrylate did not exhibit a substantial change in fluorescent durability with use of such a screen layer. In Samples 4-J and 4-K, GREEN GOLD dye was shown to not exhibit improved fluorescent durability in a color layer comprising polycarbonate used with a screen layer as provided herein.

EXAMPLE 5

Example 5 illustrates the improved fluorescent durability attained in laminates of the invention in outdoor exposure. Each sample, about 7×18 centimeters in size, was adhered to an aluminum coupon which was mounted on a black painted panel facing upward at 45° from vertical and facing south and exposed for 10 months in Arizona.

In each sample, the screen layer consisted essentially of a 3 mil (75 micrometer) film of LUCITE 47K to which, in the indicated samples, 1.2 weight percent of TINUVIN 327 was added. The color layers consisted essentially of the indicated polymeric matrix material and 0.2 weight percent of the indicated fluorescent dye.

The results are tabulated in Table V.

TABLE V

| Sample | Matrix[1] | Dye[2] | Screen[3] | Peak Reten[4] | Delta E[5] | Retain Fluor[6] |
|---|---|---|---|---|---|---|
| 5-1 | PC | RED GG | Yes | 64 | 21 | 76 |
| 5-A | PC | RED GG | No | 53 | 30 | 65 |
| 5-B | PMMA | RED GG | Yes | 62 | 22 | 83 |
| 5-C | PMMA | RED GG | No | 69 | 22 | 85 |
| 5-2 | PC | RED 5B | Yes | 68 | 30 | 46 |
| 5-D | PC | RED 5B | No | 45 | 35 | 32 |
| 5-3 | PC | LUMOGEN | Yes | 90 | 4 | 94 |
| 5-E | PC | LUMOGEN | No | 73 | 16 | 83 |
| 5-4 | PC | MACROLEX | Yes | 76 | 21 | 88 |
| 5-F | PC | MACROLEX | No | 70 | 23 | 80 |
| 5-5 | PC | 3G | Yes | 92 | 5 | 89 |
| 5-G | PC | 3G | No | 63 | 26 | 71 |
| 5-H | PC | GREEN GOLD | Yes | 48 | 51 | 18 |
| 5-I | PC | GREEN GOLD | No | 47 | 42 | 47 |

[1]Matrix polymer
[2]Fluorescent dye
[3]Whether screen layer contained UV screening agent
[4]Peak Retention
[5]CIELAB color difference determined by ISC
[6]Retained Fluorescence Various modifications and alterations of this invention will become apparent to those skilled in the art without departing from the scope and spirit of this invention.

What is claimed is:

1. A fluorescent article comprising a color layer having first and second sides and a screen layer disposed to said first side of said color layer, wherein:

a) said color layer comprises daylight fluorescent dye dissolved in a polymeric matrix, said fluorescent dye comprising one or more of the following: thioxanthene dye, thioindigoid dye, benzoxazole coumarin dye, or perylene imide dye, said polymeric matrix being one or more of the following: polycarbonate, polyacrylic imide, or polyester, and said color layer containing between about 0.01 and about 1.0 weight percent of said dye; and b) said screen layer being substantially transparent to visible light and comprising means for screening substantial portions of ultraviolet radiation incident thereto.

2. The article of claim 1 wherein said color layer contains between about 0.05 and about 0.3 weight percent of said dye.

3. The article of claim 1 wherein said screen layer substantially blocks electromagnetic radiation having a wavelength below about 340 nanometers.

4. The article of claim 1 wherein said screen layer substantially blocks electromagnetic radiation having a wavelength below about 370 nanometers.

5. The article of claim 1 wherein said screen layer substantially blocks electromagnetic radiation having a wavelength below about 400 nanometers.

6. The article of claim 1 wherein said screen layer screens at least 50 percent of the ultraviolet radiation incident thereto.

7. The article of claim 1 wherein said color layer is between about 50 and about 625 micrometers thick.

8. The article of claim 1 wherein said color layer further comprises an additional coloring agent.

9. The article of claim 1 wherein said screen layer is in direct contact with said color layer.

10. The article of claim 1 wherein said screen layer is bonded to said first side of said color layer with an intermediate layer of adhesive.

11. The article of claim 1 further comprising a retroreflective base sheet disposed on said second side of said color layer.

12. The article of claim 11 wherein said retroreflective base sheet comprises a monolayer of transparent microspheres and reflective means disposed on the side of said microspheres opposite said color layer.

13. The article of claim 1 wherein said color layer has retroreflective elements formed on said second side.

14. The article of claim 13 wherein said color layer is laminated directly to said screen layer and said retroreflective elements are cube-corner retroreflective elements.

15. The article of claim 1 wherein said article is sufficiently flexible to be wound about a mandrel having a diameter of about 1 centimeter.

16. A fluorescent retroreflective article comprising a color layer having first and second sides and a screen layer disposed to said first side of said color layer, wherein:

a) said color layer consists essentially of daylight fluorescent dye dissolved in a polymeric matrix, said fluorescent dye consisting essentially of one or more of the following: thioxanthene dye, thioindigoid dye, benzoxazole coumarin dye, or perylene imide dye, said matrix consisting essentially of one or more of the following: polycarbonate, polyacrylic imide, polyester, and said color layer containing between about 0.01 and about 1.0 weight percent of said dye; and b) said screen layer being substantially transparent to visible light and comprising means for screening substantial portions of ultraviolet radiation incident thereto;

said article comprising retroreflective elements on said second side of said color layer or a retroreflective base sheet disposed on said second side of said color layer.

17. A fluorescent article comprising a color layer having first and second sides and a screen layer disposed to said first side of said color layer, wherein:

a) said color layer comprises daylight fluorescent dye dissolved in a polymeric matrix, said fluorescent dye comprising one or more of the following: thioxanthene dye, thioindigoid dye, benzoxazole coumarin dye, or perylene imide dye, said polymeric matrix being polycarbonate, and said color layer containing between about 0.01 and about 1.0 weight percent of said dye; and b) said screen layer being substantially transparent to visible light and comprising means for screening substantial portions of ultraviolet radiation incident thereto.

18. A fluorescent article comprising a color layer having first and second sides and a screen layer disposed to said first side of said color layer, wherein:

a) said color layer comprises between about 0.01 and about 1.0 weight percent of thioxanthene daylight fluorescent dye dissolved in a polymeric matrix, said polymeric matrix being one or more of the following: polycarbonate, polyacrylic imide, polyester, or polystyrene; and b) said screen layer being substantially transparent to visible light and comprising means for screening substantial portions of ultraviolet radiation incident thereto.

19. A fluorescent retroreflective article comprising a color layer having first and second sides and a screen layer disposed to said first side of said color layer, wherein:

a) said color layer consists essentially of thioxanthene daylight fluorescent dye dissolved in a polymeric matrix, said matrix consisting essentially of one or more of the following: polycarbonate, polyacrylic imide, polyester, or polystyrene, and said color layer containing between about 0.01 and about 1.0 weight percent of said dye; and b) said screen layer being substantially transparent to visible light and comprising means for screening substantial portions of ultraviolet radiation incident thereto;

said article comprising retroreflective elements on said second side of said color layer or a retroreflective base sheet disposed on said second side of said color layer.

* * * * *

UNITED STATES PATENT AND TRADEMARK OFFICE

CERTIFICATE OF CORRECTION

PATENT NO.: 5,387,458

DATED: February 7, 1995

INVENTOR(S): Lee A. Pavelka et al.

It is certified that error appears in the above-identified patent and that said Letters Patent is hereby corrected as shown below:

In Column 9, Line 21, the section labeled "EXAMPLE 1" should read --EXAMPLE 2--.

Signed and Sealed this

Fifteenth Day of August, 1995

Attest:

BRUCE LEHMAN

*Attesting Officer* *Commissioner of Patents and Trademarks*